Jan. 22, 1924.

C. M. KENT ET AL 1,481,375

LAWN RAKE

Filed May 24, 1921

Inventors
CLYDE M. KENT and
John W. Ross,
By
Attorney

Patented Jan. 22, 1924.

1,481,375

UNITED STATES PATENT OFFICE.

CLYDE M. KENT AND JOHN W. ROSS, OF JACKSON, OHIO.

LAWN RAKE.

Application filed May 24, 1921. Serial No. 472,137.

*To all whom it may concern:*

Be it known that CLYDE M. KENT and JOHN W. ROSS, citizens of the United States of America, residing at Jackson, in the county of Jackson and State of Ohio, have invented new and useful Improvements in Lawn Rakes, of which the following is a specification.

The object of the invention is to provide a self cleaning lawn rake and more particularly to provide an attachment for a rake of this type whereby as it is moved with the teeth in contact with the surface of the ground the cleaning means is displaced or held out of obstructing relation with the teeth whereas upon the lifting of the rake head from the ground the cleaner traverses the teeth longitudinally and removes therefrom any accumulations of grass, weeds, leaves or the like to obviate the necessity of cleaning the teeth from time to time by hand or otherwise; and with this object in view the invention consists in a construction and combination of parts of which a preferred embodiment is shown in the accompanying drawings, wherein:

Figure 3 is a detail view enlarged of one of the runners for the cleaner bar.

Figure 1:
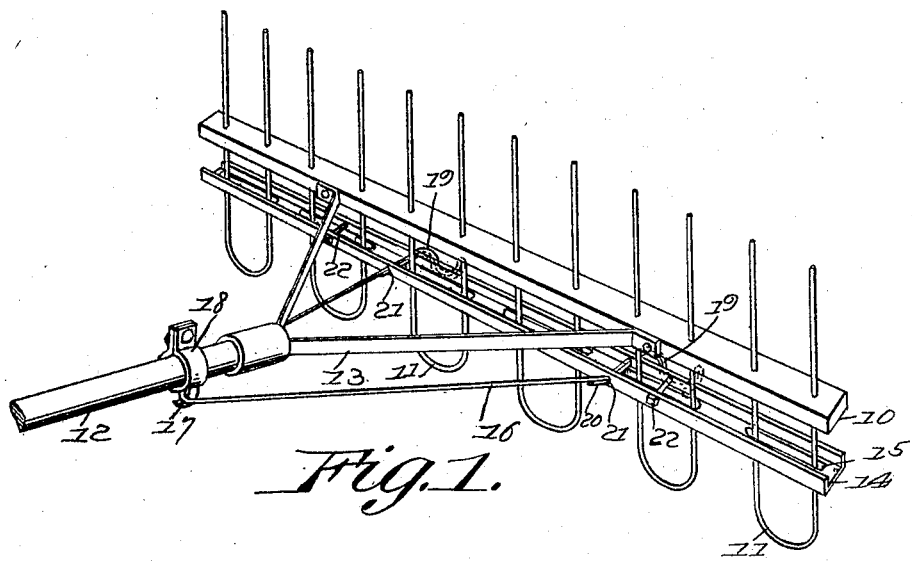
Figure 1 is a view of a lawn rake provided with a cleaning attachment constructed in accordance with the invention.
Figure 2:
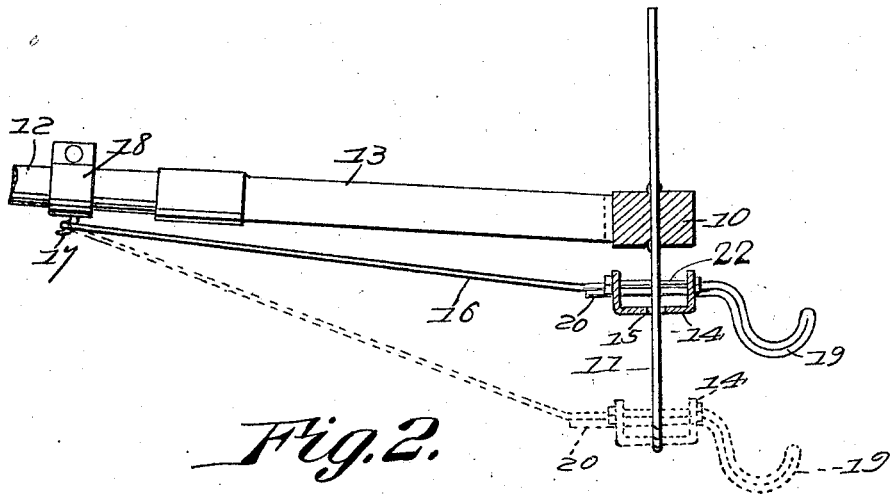
Figure 2 is a detail sectional view of the rake head showing the cleaner respectively in full and dotted lines in its normal and cleaning positions.

The rake head in connection with which the cleaner is illustrated consists of the bar 10 carrying the looped or hairpin teeth 11 preferably arranged to extend in opposite directions from the plane of the bar so as to present looped tines at one side and separate tines at the opposite side, as in the ordinary practice, the handle 12 being connected with the head bar by means of a yoke 13 or the equivalent thereof.

The cleaner consists essentially of a channel bar 14 having elongated openings 15 formed in its web portion, the teeth of the rake passing through said openings so that the cleaner bar may move freely toward and away from the plane of the rake head bar. The cleaner bar is suspended by means of forwardly divergent hanger rods 16 connected with a hinge hook 17 forming part of a clamp 18 secured to the handle at a suitable distance from the plane of the rake head. These hanger rods may be extended to form the runners 19 each of which consists of a looped rod or blank of heavy wire of which the arms 20 pass slidably through eyes 21 formed in the flanges of the cleaner bar between adjacent legs of pairs of looped teeth.

Spanning the flanges of the cleaner bar are the bolts 22 which are disposed to occupy positions between the sides of loops representing one of the tines. These bolts, therefore, act as stops for contact with the closed or looped ends of the tines to limit the movement of the cleaner as it swings away from the bar 10 and prevent disengagement of the cleaner bar from the rake tines.

The runners are downwardly deflected or bowed between their extremities and the plane of the cleaner bar 14 so as to bear upon the surface of the ground and run freely thereover as the rake is operated, the free looped extremities of the runners being upturned as indicated to avoid obstructive contact with any obstacles encountered by the rake and to ride freely over any unevenness in the surface of the soil.

It will be understood that, whereas when the rake is brought into operative position with the tines in contact with the surface of the ground, the cleaner will be moved inward toward the rake head bar and thus will permit the normal use of the teeth or tines of the rake head whereas when the rake head is raised to make a succeeding stroke the cleaner bar will immediately drop to the ends of the tines and thus remove therefrom any accumulations so that a continuous operation of the rake is possible.

It will be noted furthermore that a device such as described can readily be applied to rakes now in use or on the market or already constructed, simply by positioning the openings in the bar 14 to correspond with the spacing of the rake teeth, the only engagement of the cleaner with the rake being by means of the bolts 22 and the clamp 18 suitably embracing or otherwise secured to the rake handle.

Having described the invention, what is claimed as new and useful is:—

The combination with a rake having looped or hair-pin tines, of a channel shaped cleaner bar disposed in parallelism with the rake head and provided with openings for the reception of said tines, hanger rods having pivotal connections at their rear ends with the rake handle and extended to form runners of which each consists of a rod or heavy wire looped to provide parallel arms which pass slidably through eyes formed in the flanges of the cleaner bar between adjacent teeth loops.

In testimony whereof they affix their signatures.

CLYDE M. KENT.
JOHN W. ROSS.